Jan. 9, 1940.                O. LIEBMANN                2,186,806

RANGE FINDER

Filed July 20, 1939

INVENTOR.
Oscar Liebmann.
BY Peter M. Boesen
ATTORNEY.

Patented Jan. 9, 1940

2,186,806

UNITED STATES PATENT OFFICE 2,186,806

RANGE FINDER

Oscar Liebmann, Bergenfield, N. J., assignor to Q. O. S. Corporation, New York, N. Y., a corporation of New York Application July 20, 1939, Serial No. 285,528

1 Claim. (Cl. 88—2.4)

My invention relates to improvements in range finders of the type which are used either separately or fastened to a camera, to read the correct distance, whereupon the camera lens is focused, and which consist primarily of a fixed semi-transparent reflector and a rotatable reflector mounted at a certain distance away from the fixed one and with finely adjustable means for turning the rotatable reflector and calibrated indicating means from which the distance may be read.

An important object of my invention is to provide a range finder which is accurate and convenient in use.

A further object of my invention is to provide a range finder which can be manufactured in quantities at a low cost and which is, therefore, simplified in its construction as compared with those used hitherto.

Other objects and advantages of my invention will be apparent during the course of the following description.

Figure 1:
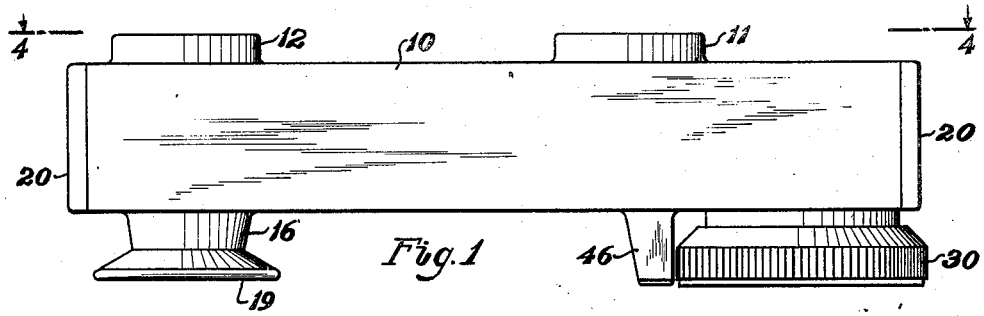
Figure 2:
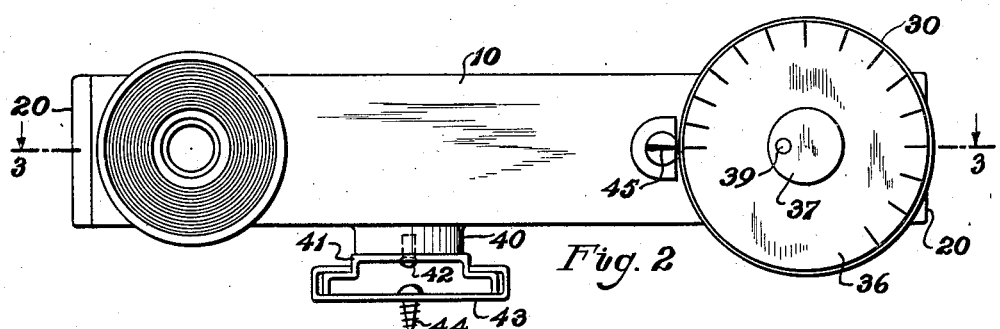
Figure 3:
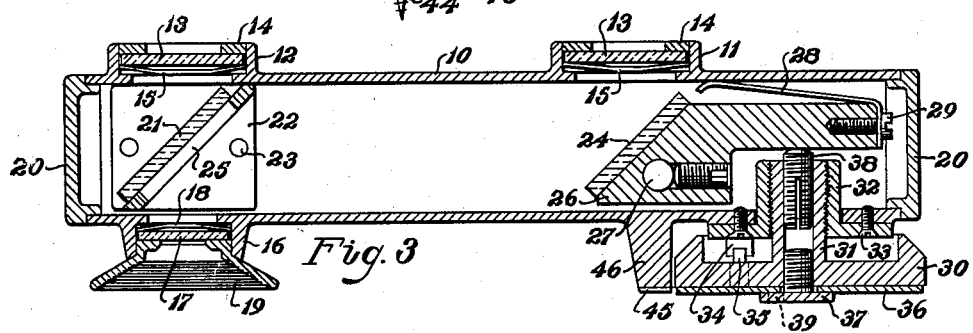
Figure 4:
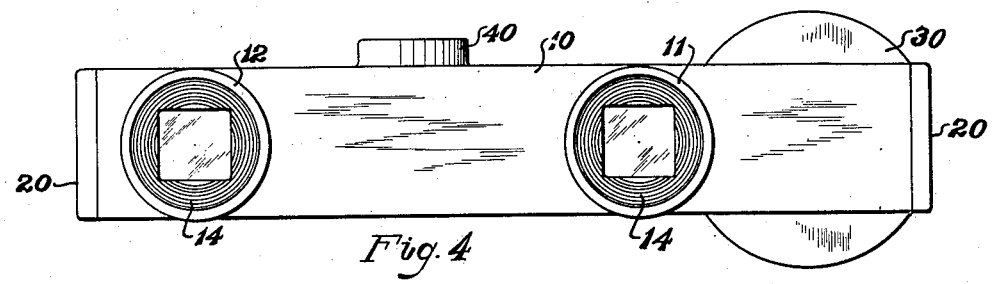

In the accompanying drawing, forming part of this specification, and in which like numerals are employed to designate like parts throughout the same, Figure 1 is a side view of a range finder embodying my invention, Figure 2 is a rear elevation of the range finder, Figure 3 is a section along line 3—3 in Fig. 2, and, Figure 4 is a front elevation of the range finder.

In the drawing, wherein for the purpose of illustration, is shown a preferred embodiment of my invention, the numeral 10 designates a housing of tubular shape and square cross section. On one of its four sides the tubular housing 10 has two projections 11 and 12 each of which contain a glass window 13 which is held in place by a washer 14 which has a substantially square aperture. Suitable lenses could replace the glass windows, if desired. A spring washer 15 is placed behind the glass in order to prevent cracking of same.

On the opposite side of the tubular housing, in respect to the projection 12, is another projection 16 inside of which is another glass window or lens 17 backed by a spring washer 18 and held in place by the eye piece 19. The ends of the tubular housing are closed up by covers 20. Inside the tubular housing, between projections 12 and 16 is mounted a fixed reflector 21 which is held rigidly in a 45 degree angle by mounting 22 and which again is secured to the side wall of the tubular housing by rivets 23.

In the other end of the tubular housing is mounted a rotatable reflector 24 which is directly inside the window 11. The reflector 24 is not transparent and is adjustable in such a position that light coming in through window 11 will be reflected parallel to the axis of the tubular housing and will hit the rear face of the semi-transparent reflector 21 which will reflect the light out through window 17 to the eye of the observer. This is possible because mounting 22 has an opening 25 through which the light may pass. At the same time light may pass directly in through window 12, through the semitransparent reflector 21 and out again through window 17 to the eye of the observer.

Reflector 24 is fixed to lever 26 which is pivoted upon shaft 27 which again is journalled in both sides of the tubular housing 10. The lever 26 is movable one way by spring 28 which is fastened to one end of the lever with screw 29. To move the lever 26 in the opposite direction one turns the knurled knob 30 which has a threaded sleeve 31 which runs in threads in the tapped bushing. The bushing 32 is fastened to the tubular housing 10 by screws 33 and 34. The screw 34 also serves as a stop against which the end of screw 35 will strike at the end of its travel. The screw 35 is fixed in knob 30. A dial plate 36 is fastened to knob 30 by screw 37 and carries divisions which indicate the distance directly in units of length. A set screw 38 may be reached by removing screw 37 and by which the position of the rotatable reflector 24 may be set to the correct reading of distance as indicated on the dial 36. To prevent tampering with the adjustment of screw 38 the lock screw 37 does not have the usual slot for a screw driver, but must be removed by a special key fitting into hole 39.

On one side of the tubular housing 10 is provided a solid projection which serves as a base for mounting. In Fig. 2 is shown the usual method of mounting comprising a channel strip 41 which is fastened to base 40 by screws 42. The bent up edges of channel 41 fit into a receptacle 42 which may be fastened to a camera by screws 44. The channel 41 is slidable in receptacle 43 and thus the range finder may be removed without unloosening any screws.

The operation of my invention is based upon the well known principle illustrated in Figure 4 of my copending application, Serial No. 257,038, filed Feb. 18, 1939. The range finder is held in a convenient position with the eye piece 19 in front of one eye and the knob 30 is turned either one way or the other until coincidence of the two pictures is obtained. The pointer 45 mounted upon the projection 46 will then point to a given numeral on the dial which will indicate the distance of the object. The lens of the camera is then set for this distance manually.

It is to be understood that the form of my invention, herewith shown and described, is to be taken as a preferred example of the same, and that various changes in the shape, size and arrangement of parts may be resorted to without departing from the spirit of the invention, or the scope of the subjoined claim.

Having thus described my invention, I claim:

In a range finder of the character described a tubular housing closed at both ends; two substantially square windows in said housing, one near each end of the housing and located on one of the four sides of same; a viewing aperture on the opposite side of the housing and in line with one of the square windows; a fixed semi-transparent reflector mounted at an angle inside the tubular housing between the viewing aperture and one of said windows; a shaft pivoted transversally through the tubular housing; a lever turnable on said pivot, the short end of the lever being planed off at a 45 degree angle with its longitudinal axis; a mirror fastened to the inclined plane of the lever; a spring fastened to the other end of the lever, said lever and spring being located at one end of the tubular housing; a tapped bushing fastened to the rear side of the tubular housing; a finely threaded hollow sleeve one end of which has a large head, said threaded sleeve running in the tapped bushing; a dial plate fastened on the flat top of the head; an adjustable set-screw in said hollow sleeve in engagement with the reflector lever; a lock screw closing the outside opening of the hollow sleeve, and stops limiting the rotation of the dial.

OSCAR LIEBMANN.